(12) United States Patent
Nishita

(10) Patent No.: US 6,688,779 B2
(45) Date of Patent: Feb. 10, 2004

(54) OPTICAL/ELECTRIC COMPOSITE CONNECTOR

(75) Inventor: Naoki Nishita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/024,637

(22) Filed: Dec. 17, 2001

(65) Prior Publication Data

US 2002/0102066 A1 Aug. 1, 2002

(30) Foreign Application Priority Data

Dec. 20, 2000 (JP) ........................................ 2000-387564

(51) Int. Cl.[7] ........................ H01R 33/945; G02B 6/38
(52) U.S. Cl. ........................................ 385/75; 439/577
(58) Field of Search ............................. 385/101, 53, 76, 385/77, 139, 88, 89, 92, 75; 439/577

(56) References Cited

U.S. PATENT DOCUMENTS 4,844,582 A * 7/1989 Giannini .................. 439/577
6,335,996 B1 * 1/2002 Yamaguchi ................ 385/134
6,416,334 B1 * 7/2002 Plishner ..................... 439/577
6,491,409 B1 * 12/2002 Sharrah et al. ............. 362/206
6,499,889 B1 * 12/2002 Shirakawa et al. .......... 385/88

* cited by examiner

Primary Examiner—Javaid H. Nasri
(74) Attorney, Agent, or Firm—Knobbe, Martens, Olson & Bear LLP

(57) ABSTRACT

An optical/electric composite connector is capable of firmly shielding optical elements, while the optical/electric composite connector is capable of performing both an optical connection of the optical elements and an electric connection by electric terminals. An optical/electric composite connection (1) is formed by connecting a first connector housing (3) and a second connector housing (4). The first connector housing (3) stores the optical elements and is formed by electric conductive resin. The second connector housing (4) is formed by non-electric conductive resin. Both the first connector housing (3) and the second connector housing (4) are detachably connected to each other. A metal case (6) for fixing the optical elements stored in the first connector housing is mounted on the first connector housing (3).

7 Claims, 4 Drawing Sheets

OPTICAL/ELECTRIC COMPOSITE CONNECTOR

FIELD OF THE INVENTION

The present invention is related to an optical/electric composite connector mounted on, for example, a vehicle so as to be used in optical communications.

BACKGROUND OF THE INVENTION

Very recently, vehicle intelligence technologies are considerably progressed. For instance, while car navigation systems are employed, present positions of vehicles are displayed on maps. Also, vehicles are managed, for instance, traffic jams of vehicles may be solved while utilizing the ITS (Intelligent Transport Systems). In conjunction with such vehicle intelligence technologies, processing amounts of communication information such as data, images, and voice within vehicles are increased.

As a consequence, optical communications are carried out within vehicles such as automobiles with employment of optical fibers functioning. As this information transfer media having large capacities. The above-explained optical communication may be carried out as follows. That is, while light emitted from a light emitting element is entered into one end side of an optical fiber so as to be propagated through this optical fiber, this propagated light is received by a light receiving element which is provided on the other end side of the optical fiber. In general, when an optical fiber is connected to an optical element such as the above-described light emitting element and light receiving element, an optical connector is employed.

Also, a plastic optical fiber owns a large diameter, and may be easily handled, as compared with a glass optical fiber. As a consequence, such plastic optical fibers may be applied to communication purposes within vehicles.

SUMMARY OF THE INVENTION

An optical/electric composite connector is featured by comprising:
   a first connector housing for storing thereinto an optical element; and
   a second connector housing on which an electric terminal is provided; wherein:
   the first connector housing is formed by electric conductive resin; and
   the second connector housing is formed by non-electric conductive resin.

BRIEF DESCRIPTION OF THE DRAWINGS

Exemplary embodiments of the invention will now be described in conjunction with drawings, in which.

DETAILED DESCRIPTION

On the other hand, for instance, an electric connector used for a power supply, and another electric connector used for an electronic communication which is applied to information transmissions executed in low speeds are mounted on an electric appliance for the above-described vehicle, which performs the optical communication. As a consequence, such a work is required by which these electric connectors are engaged with optical connectors. As a result, in order to omit this engaging work, an application of an optical/electric composite (hybrid) connector equipped with both functions of an optical connector and an electric connector may be considered. However, properly-designed optical/electric composite connectors could not be proposed because of the below-mentioned reasons:

For instance, since large numbers of electromagnetic waves generated from various electronic appliances are present within a vehicle, the above-described optical element is required to avoid that adverse influences of noise caused by these electromagnetic waves are given to this optical element. In other words, the above-described optical/electric composite connector requires such a construction capable of shielding the optical element. However, when the optical/electric connector is manufactured by employing an electric conductive material such as a metal in order to shield the optical element, an electric terminal is electrically connected to this electric-conductive optical/electric composite connector. As a result, this electric-conductive optical/electric composite connector could not realize the functions as the connector.

Also, in such a case that the optical/electric composite connector is formed by using resin having a non-electric conductive characteristic and furthermore this connector is surrounded by a metal case, a hole is made in a connection portion between the above-described optical element and an optical fiber, so that a sufficient shielding function cannot be realized. As a result, the metal case is made long on the side of the optical fiber connection portion in order to achieve effect, so that the resulting optical/electric composite connector would become bulky.

Figure 1:
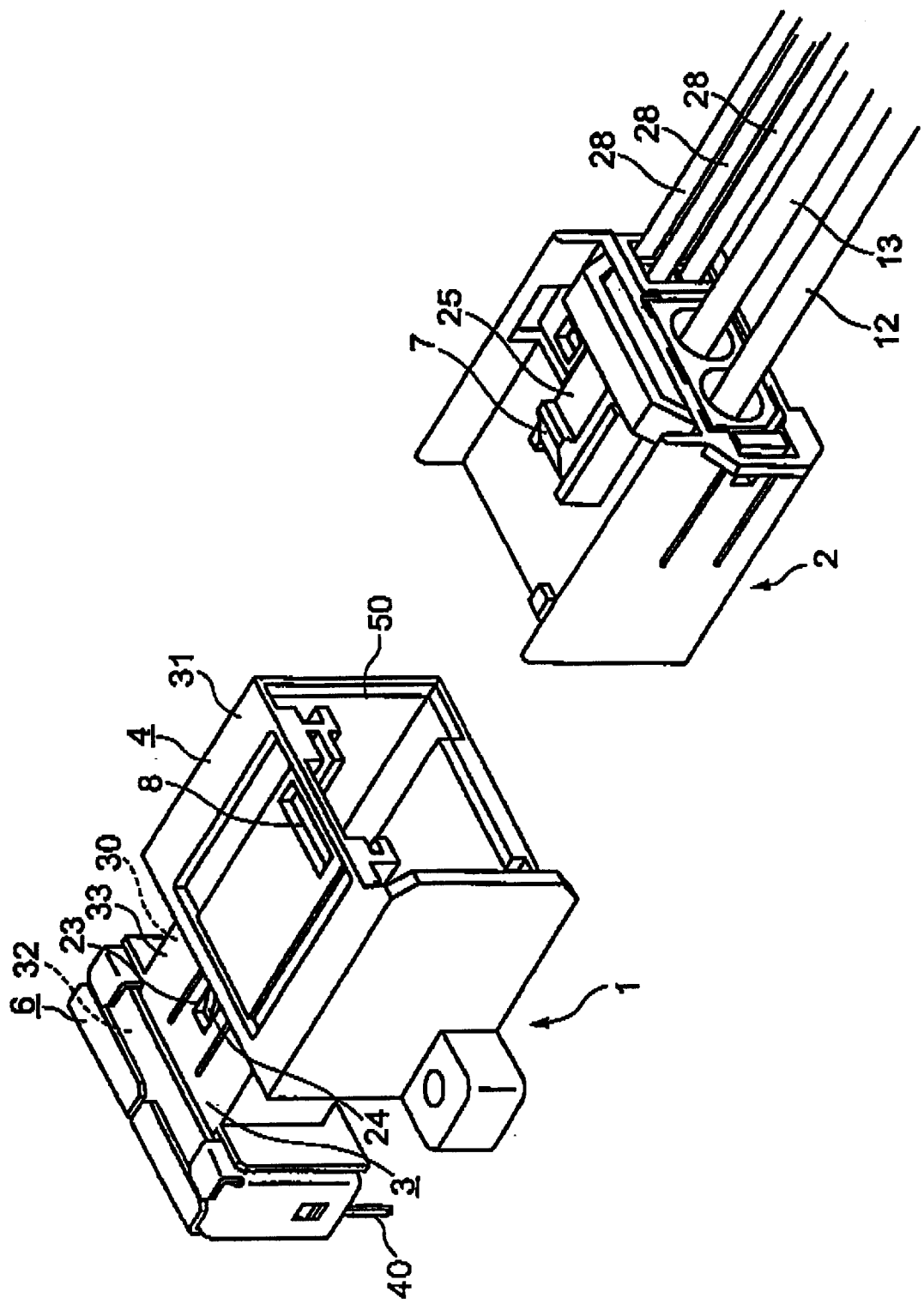
FIG. 1 is a perspective view for indicating an optical/electric composite connector according to an embodiment of the present invention in combination with a connection counter party.
Figure 2:
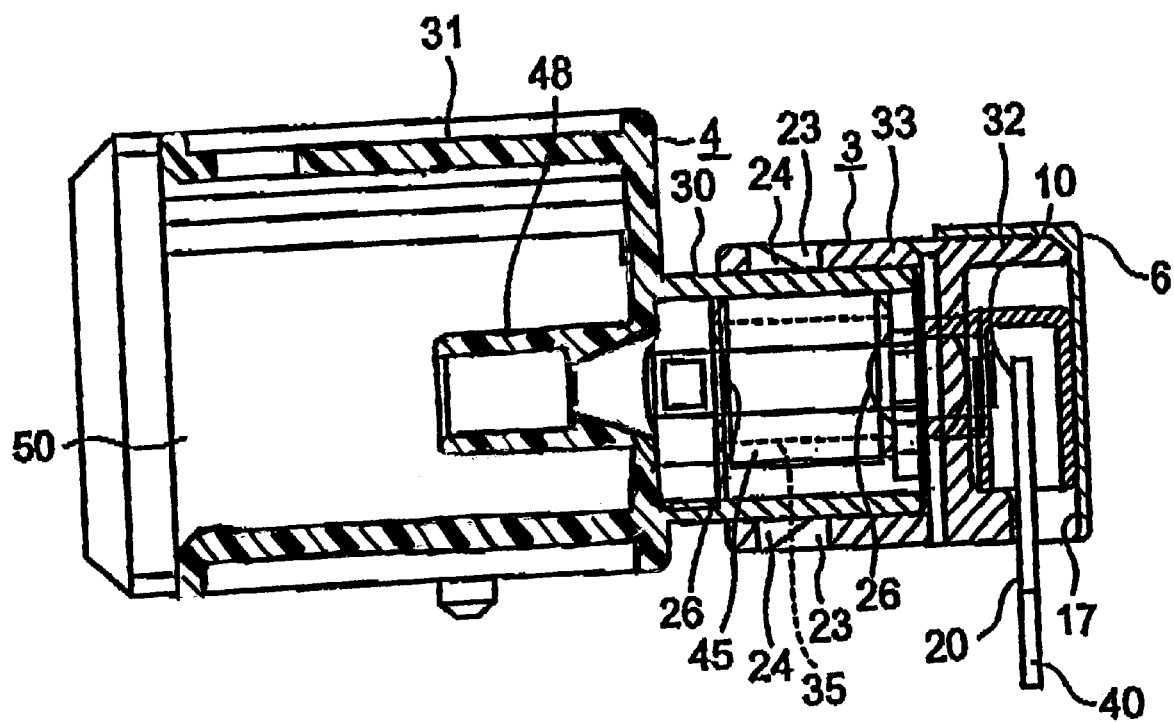
FIG. 2 is a sectional view for showing the optical/electric composite connector according to the embodiment of the present invention.

One aspect of an optical/electric composite connector according to the present invention is such a compact optical/electric composite connector capable of realizing both an optical connection of optical elements and an electric connection using electric terminals, and furthermore, capable of shielding these optical elements from noise, Referring now to drawings, various preferred embodiments of the present invention will be described. FIG. 1 is a perspective view for indicating an optical/electric composite connector 1 according to an embodiment of the present invention in combination with an optical component as a connection counter component. It should be understood that in FIG. 1, the optical/electric composite (hybrid) connector 1 according to one embodiment of the present invention is arranged opposite to a plug connector 2 via an interval. Also, FIG. 2 is a sectional view for showing the optical/electric composite connector 1 of one embodiment. Furthermore, FIG. 3 shows an exploded structural diagram of the optical/electric composite connector 1 of one embodiment.

Figure 3:
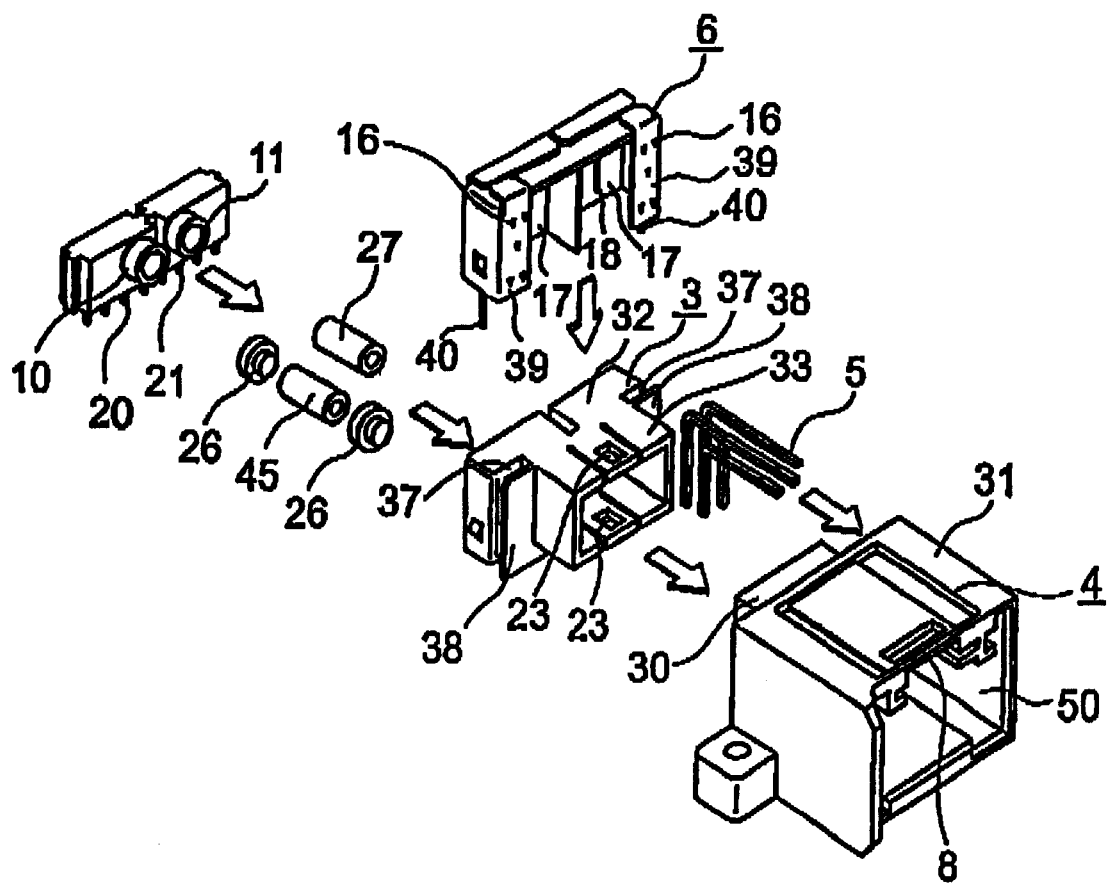
FIG. 3 is an explanatory diagram for showing a structure of the optical/electric composite connector under exploded condition, according to the embodiment of the present invention.

As illustrated in FIG. 1 to FIG. 3, the optical/electric composite connector 1 according to one embodiment contains a first connector housing 3 and a second connector housing 4. The first connector housing 3 stores thereinto an optical element. An electric terminal 5 (see FIG. 3) is provided with the second connector housing 4. The first connector housing 3 is formed by employing PBT (polybutylene telephtalate) containing a carbon filler corresponding to electric conductive resin. Also, the second connector housing 4 is formed by employing PBT containing a glass filler corresponding to non-electric conductive resin.

The above-described second connector housing 4 is provided on one end side of the first connector housing 3. Both the first connector housing 3 and the second connector housing 4 are detachably connected to each other. The second connector housing 4 owns a box-shaped plug connector engaging portion 31, the front end of which is made as an opening 50. The second connector housing 4 forms a connecting portion 30 which is located opposite to the opening 50, and is connectable to the first connector housing 3.

On the other hand, the first connector housing 3 contains both a connecting portion 33 connectable to the second connector housing 4, and a storage portion 32 for storing thereinto an optical element. The first connector housing 3 is engaged with the second connector housing 4 in such a manner that the connecting portion 30 of the second connector housing 4 is covered by the connecting portion 33.

As represented in FIG. 2 and FIG. 3, one pair of upper/lower claw engaging holes 23 are formed in the connecting portion 33. Both the first connector housing 3 and the second connector housing 4 are fixed by engaging one pair of upper/lower claw portions 24 with one pair of these upper/lower claw engaging holes 23, respectively. The paired upper/lower claw portions 24 are provided on the connecting portion 30 of the second connector housing 4. Also, the connection between the first connector housing 3 and the second connector housing 4 may be released by disconnecting the above-explained claw portions 24 from the above-described claw engaging holes 23.

In one embodiment, the above-explained optical element corresponds to a light emitting element 10 and a light receiving element 11. While the light emitting element 10 and the light receiving element 11 are arranged side by side, both the light emitting element 10 and the light receiving element 11 are stored in the storage portion 32 of the first connector housing 3.

The light emitting element 10 is a light emitting diode, and a light emitting plane of this light emitting diode is arranged to be directed to the side of the second connector housing 4. A light receiving plane of the light receiving element 11 is arranged to be directed to the side of the second connector housing 4. It should also be noted that reference numeral 20 indicates a terminal portion of the light emitting element 10, and reference numeral 21 represents a terminal portion of the light receiving element 11.

Also, in one embodiment, a metal case 6 which fixes the optical elements (namely, light emitting element 10 and light receiving element 11) stored in the first connector housing 3 is provided in such a manner that this metal case 6 covers the storage portion 32 of the first connector housing 3. A terminal portion 40 is formed on the metal case 6 in order to be connected to the ground.

The metal case 6 is formed in such a manner that, for instance, a metal plate made of brass is bent. As indicated in FIG. 3 and FIG. 4B, a plurality of projection portions 16 are provided on a surface of a wall 39 of the metal case 6. As indicated in FIG. 3, the metal case 6 is mounted from the upper side of the first connector housing 3 on this first connector housing 3, and the wall 39 is inserted into a groove, or trench 37 of the first connector housing 3. As a result, the projection portions 16 are encroached in the first connector housing 3, so that the metal case 6 is conducted to the first connector housing 3. The surface of the metal case 6 is plated by employing tin, nickel, gold, soldering, and the like as a major purpose of corrosion preventing effects.

Figure 4A:
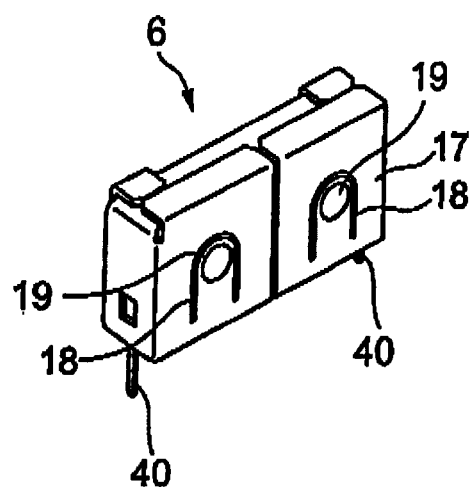
FIG. 4A is an explanatory diagram for explaining a metal case, as viewed from a rear end side, which is provided in the optical/electric composite connector according to the embodiment of the present invention.
Figure 4B:
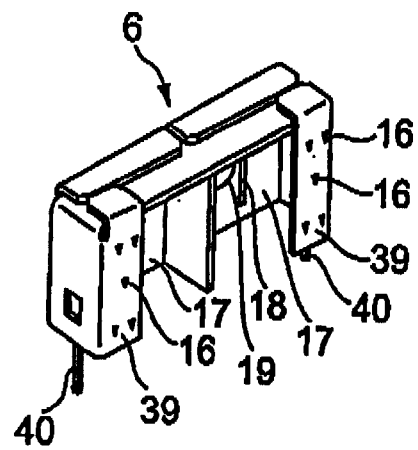
FIG. 4B is an explanatory diagram for explaining the metal case, as viewed from a front end side, which is provided in the optical/electric composite connector according to the embodiment of the present invention.

As shown in FIG. 4A, a spring mechanism is provided on a plane 17 of the metal case 6 on the fixing side of the optical elements. This spring mechanism urges the light emitting element 10 and the light receiving element 11 against the side of the second connector housing 4. In one embodiment, this spring mechanism is constituted by that a U-shaped slit 18 is formed in the plane 17 of the metal case 6 in the fixing side of the optical elements, and a convex portion 19 is formed in such a manner that this convex portion 19 projects on the side of such a plane abutting upon both the light emitting element 10 and the light receiving element 11. Since the spring mechanism owns the above-explained force, this spring mechanism may have such a function. That is, this function is capable of absorbing errors in sizes of the light emitting element 10, the light receiving element 11, and the storage portion 32 of the first connector housing 3, and is capable of fixing both the light emitting element 10 and the light receiving element 11 into the storage portion 32.

As shown in FIG. 1, an optical component which is connected to the optical/electric composite connector 1 according to one embodiment is a plug connector 2. In this plug connector 2, a first optical fiber 12 and a second optical fiber 13 are arranged side by side, while the first optical fiber 12 is optically connected to the optical emitting element 10 and the second optical fiber 13 is optically connected to the light receiving element 11. Each of connecting edge planes of the first and second optical fibers 12 and 13 are fixed to a ferrule (not shown), respectively. These first and second optical fibers 12 and 13 correspond to plastic optical fibers. When the plug connector 2 is inserted so as to be engaged with the second connector housing 4, these first and second optical fibers 12 and 13 may be inserted into the second connector housing 4.

It should be noted that a lock arm 25 is provided on an upper surface side of the plug connector 2. An engaging claw 7 formed on a tip portion side of this lock arm 25 is engaged with a claw engaging portion 8 of the optical/electric composite connector 1, so that the plug connector 2 is fixed to the optical/electric composite connector 1. Also, when the engaging claw 7 is disconnected from the claw engaging portion 8, the connection between the plug connector 2 and the optical/electric composite connector 1 is released.

Figure 5A:
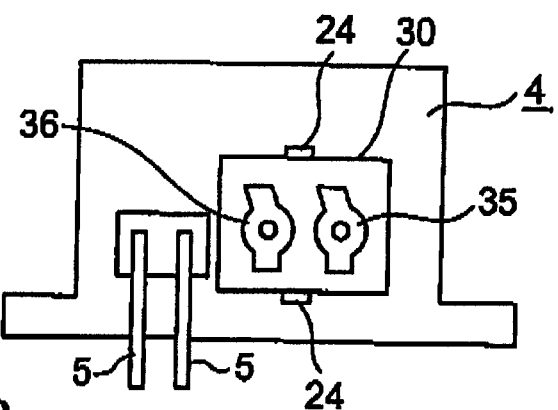
FIG. 5A is a front view for showing a second connector housing employed in the optical/electric composite connector according to the embodiment of the present invention.
Figure 5B:
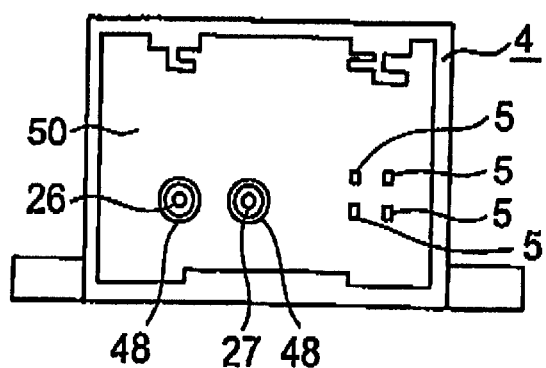
FIG. 5B is a rear view for showing the second connector housing employed in the optical/electric composite connector according to the embodiment of the present invention

As indicated in FIG. 5A and FIG. 5B, one pair of through hole portions 35 and 36 are formed in the connection portion 30 of the second connector housing 4. These hole portions 35 and 36 are located opposite to the light emitting element 10 and the light receiving element 11. Two lenses 26 and a cylinder 45 which is sandwiched by these lenses 26 are provided in the hole portion 35 on the side of the light emitting element 10. An optical-connection-mediated optical fiber 27 is provided in the hole portion 36 on the side of the light receiving element 11.

The light emitting element 10 owns a larger radiation aperature number than an aperture number of the first optical fiber 12. The lens 26 owns such a function that the lens 26 collects this light of the light emitting element 10 in such a manner that a light incident aperture number becomes smaller than the aperture number of the first optical fiber 12, and then this lens 26 enters the collected light into the first optical fiber 12.

As shown in FIG. 2, a cylindrical-shaped sleeve 48 is arranged side by side within the plug connector engaging portion 31 of the second connector housing 4 in such a manner that this cylindrical-shaped sleeve 48 is projected toward the opening 50. It should also be noted that although only one sleeve 48 is indicated in this drawing, one pair of sleeves 48 are arranged side by side so as to form such a construction capable of conducting the ferrule of the plug connector 2, as indicated in FIG. 5B.

As shown in FIG. 1, four conducting wires 28 are inserted and fixed in the plug connector 2. When the plug connector 2 is inserted and fixed in the second connector housing 4, these conducting wires 28 are connected to the electric terminals 5.

The optical/electric composite connector according to one embodiment of the present invention is arranged in accordance with the above-explained structure. As represented in FIG. 3, when the optical/electric composite connector 1 of one embodiment is manufactured, the respective structural elements which are separately formed are prepared. In other words, the first connector housing 3, the second connector housing 4, the metal case 6, the electric terminal 5, the lens 26, the cylinder 45, the optical-connection-mediated optical fiber 27, the light emitting element 10, and also the light receiving element 11 are prepared.

Then, as indicated in this drawing, the electric terminal 5 is mounted on the second connector housing 4. The lens 26, the cylinder 45, and the optical-connection-mediated optical fiber 27 are inserted into the second connector housing 4 so as to be fixed thereon. Also, both the light emitting element 10 and the light receiving element 11 are inserted into the first connector housing 3. Under this condition, the metal case 6 is inserted into the first connector housing 3, and both the light emitting element 10 and the light receiving element 11 are fixed on the first connector housing 3. Then, this first connector housing 3 is inserted into the second connector housing 4 so as to be fixed thereon.

Also, as shown in FIG. 1, when the plug connector 2 is inserted into the plug connector engaging portion 31 of the optical/electric composite connector 1 according to one embodiment, the optical elements (namely, both light emitting element 10 and light receiving element 11) are optically connected to the optical fibers 12 and 13. In other words, the first optical fiber 12 which is fixed on the plug connector 2 is optically connected to the light emitting element 10 via the lens 26 which is fixed on the optical/electric composite connector 1. Also, the second optical fiber 13 which is fixed on the plug connector 2 is optically connected to the light receiving element 11 via the optical-connection-mediated optical fiber 27 which is fixed on the optical/electric composite connector 1.

Further, since the plug connector 2 is inserted into the optical/electric composite connector 1, the conductive wires 28 fixed to the plug connector 2 are electrically connected to the electric terminals 5 which are provided on the optical/electric composite connector 1.

As previously described, in the optical/electric composite connector 1 of one embodiment, both the optical connections between the optical elements (light emitting element 10 and light receiving element 11), and the electrical connections by using the electrical terminals 5 can be very easily and very correctly carried out.

Also, in the optical/electric composite connector 1 of one embodiment, the first connector housing 3 which stores thereinto both the light emitting element 10 and the light receiving element 11 is made of electric conductive resin. As a result, while both the light emitting element 10 and the light receiving element 11 are electrically shielded, it is possible to avoid that both the light emitting element 10 and the light receiving element 11 are adversely influenced by noise caused by the electromagnetic waves.

In particular, in accordance with one embodiment of the present invention, the metal case 6 is provided so as to cover the first connector housing 3. As explained above, when the optical elements are shielded in the double manner by employing both the first connector housing 3 made of the electric conductive resin and the metal case 6, the shielding effect of the optical elements may be furthermore improved. In other words, this double shielding structure may produce the higher shielding effects than the following shielding effect that the optical elements are shielded by employing a single housing made of electric conductive resin, and/or the optical elements are shielded by a single metal case. It should also be noted that when the optical elements are shielded by both the housing made of the electric conductive resin and the metal case, the shielding effect may be improved which could be revealed by performing the experiments by Inventors of the present invention.

Furthermore, the optical/electric composite connector 1 of one embodiment is arranged in such a manner that since the projection portion 16 of the metal case 6 is encroached into the first connector housing 3, the metal case 6 may be electrically conducted to the first connector housing 3, As a result, both conducting of the electric conductive resin and fixing of the light emitting element 10 and the light receiving element 11 can be readily carried out by one action.

Furthermore, in the optical/electric composite connector 1 of one embodiment, the second connector housing 4 on which the electric terminal 5 is mounted is made of non-electric conductive resin. As a result, the electric terminal 5 is not electrically connected to the second connector housing 4. Then, while the conductive wires 28 which are inserted/fixed to the plug connector 2 are inserted into the second connector housing 4, the conductive wires 28 can be electrically connected to an electric circuit and the like.

Furthermore, in the optical/electric composite connector 1 of one embodiment, both the first connector housing 3 and the second connector housing 4 are detachably provided. As a result, the second connector housing 4 may be replaced, if necessary. In this case, for example, such second connector housings 4 that total numbers of the electric terminals 5 are different from each other are prepared in correspondence with, for example, a total number of the conductive wires 28 of the plug connector 2 functioning as the connection counter component. The second connector housing 4 may be replaced, if necessary.

Also, in the optical/electric composite connector 1 of one embodiment, as explained above, since both the first connector housing 3 and the second connector housing 4 are detachably connected to each other, it is possible to easily perform such a mounting work that the electric terminal 5 is mounted on the second connector housing 4. As a result, the optical/electric composite connector 1 can be easily manufactured.

Furthermore, in accordance with the optical/electric composite connector 1 of one embodiment, the spring mechanism is provided on the plane 17 of the metal case 6 on the fixing side of the optical elements. This spring mechanism urges the light emitting element 10 and the light receiving element 11 against the side of the second connector housing 4. As a result, in the optical/electric composite connector 1 of one embodiment, since the spring mechanism is employed, this spring mechanism is capable of absorbing errors in the sizes of the light emitting element 10, the light receiving element 11, and the storage portion 32 of the first connector housing 3 even when these errors occur. As a consequence, the optical/electric composite connector 1 of one embodiment can fix both the light emitting element 10 and the light receiving element 11 into the storage portion 32.

As previously explained, in the optical/electric composite connector 1 of one embodiment, since the dimensions of the light emitting element 10, the light receiving element 11, and the first connector housing 3 need not be made in very high precision, this optical/electric component connector 1 may be manufactured in lower cost.

In addition, the above-described spring mechanism is constituted by that the U-shaped slit 18 is formed in the plane 17 of the metal case 6 on the fixing side of the optical elements, and the convex portion 19 is formed in such a manner that this convex portion 19 is projected on the side of such the plane abutting upon both the light emitting element 10 and the light receiving element 11. In other words, in the above-described spring mechanism, the elastic member such as a coil spring is not separately provided with the metal case 6. As a consequence, in accordance with the optical/electric composite connector 1 of one embodiment, a total number of structural components is not increased, but also both the light emitting element 10 and the light receiving element 11 can be fixed in such a very easy manner.

Furthermore, one embodiment corresponds to such an optical/electric composite connector in which the light emitting element 10 and the light receiving element 11 are arranged side by side. As a result, since the plug connector 2 is engaged with the optical/electric composite connector 1 of one embodiment, the optical fibers 12 and 13 can be optically connected to the light emitting element 10 and the light receiving element 11 in a bach manner. In other words, in accordance with the optical/electric composite connector 1 of one embodiment can realize both the reduction of the total quantity of the connector components and also the improvements in the connector connecting work capability.

It should be understood that the present invention is not limited to the above-explained embodiments, but may be accomplished by employing various embodiment modes. For example, in the above-explained embodiment, the four electric terminal 5 are provided on the side of the second connector housing 4, but a total number of these electric arranging terminals is not specifically limited thereto, so that this total arranging number thereof may be properly selected. The total arranging number of the electric terminal 5 may be selected to be, for example, 8, 12, 24, and the like in correspondence with a total quantity of conductive wires 28 provided in the plug connector 2 on the side of the connection counter party.

Also, in the above-explained embodiment, the U-shaped slit 18 is formed in the plane 17 on the fixing side of the optical elements as the spring mechanism of the metal case 6. It should also be noted that as the spring mechanism of the metal case 6, such a slit having any shape other than the U-shape may be formed, for instance, a slit in the shape of a square with one side missing, or a "C"-shaped slit may be alternatively formed. Also, not only a slit is formed, but also, at least a portion of the plane 17 on the fixing side of the optical elements may be bent to the side of the optical element such as the light emitting element 10 and the light receiving element 11.

In addition, a plurality of projection portions 16 are provided on the metal case 6 in the above-described embodiment, The present invention is not specifically limited to a total arranging number of these projection portions 16 and the formation mode thereof, but these items may be properly set. Also, the projections 16 may be omitted. It should also be understood that with respect to the structure provided with the projection portion 16, when the metal case 6 is mounted on the first connector housing 3, conducting of the first connector housing 3 can be firmly carried out by one action.

In addition, in the above-described embodiment, the metal case 6 is made of brass. Alternatively, this metal case 6 may be made of stainless steel.

Moreover, in the above-described embodiment, the first connector housing 3 is formed by employing PBT into which the carbon filler is contained, whereas the second connector housing 4 is formed by employing PST into which the glass filler is contained. However, the present invention is not limited to these forming materials of the first and second connector housings 3 and 4, but these forming materials may be properly set. In other words, the first connector housing 3 may be made of electric conductive resin, and the second connector housing 4 may be made of non-electric conductive resin.

Also, the shapes and the arranging positions of the first and second connector housings 3 and 4 are not limited to those of the above-explained embodiment, but may be properly set.

In the above-described embodiment, the first connector housing 3 and the second connector housing 4 are detachably connected. Alternatively, the first connector housing 3 and the second housing 4 are not necessarily detachably connected. In other words, the optical/electric composite connector 1 may be formed in such a manner that both the first connector housing 3 and the second connector housing 4 may be formed in a coupling member by way of, for example, an integral molding method. It should be noted that when the first connector housing 3 and the second connector housing 4 are separately formed and are detachably connected each other, as explained in the above-described embodiment, the optical/electric composite connector 1 may be manufactured in an easy manner.

Furthermore, one set of both the light emitting element 10 and the light receiving element 11 are arranged side by side to be stored. However, the optical elements which are stored in the optical/electric composite connector of the present invention are not limited to the above-explained optical elements, but may be properly set. In other words, the optical/electric composite connector may store thereinto only the light emitting element 10, and alternatively may store thereinto only the light receiving element 11. Also, a total arranging number of the light emitting element 10 and the light receiving element 11 may be selected to be one, or plural arranging numbers.

In addition, the above embodiment has described that the optical/electric composite connector of the present invention is used in the optical communications executed within the vehicle. However, the utilizing field of the optical/electric composite connector according to the present invention is not limited only to the above-explained optical communication of the vehicle, but may be properly modified. That is to say, the optical/electric composite connector according to the present invention may be applied to various applications of the optical communications such as FA (factory automation), a home-used LAN, an audio field, and a PC (personal computer).

Also, in the above-explained embodiment, the optical fiber which is inserted into the optical/electric composite connector is the plastic optical fiber. Alternatively, a glass optical fiber may be employed, and thus, there is no limitation in the sort of the optical fiber.

What is claimed is:

1. An optical/electric composite connector comprising:
    a first connector housing for storing thereinto an optical element;
    a second connector housing comprising an electric terminal;
    a metal case fixing the optical element stored in said first connector housing, wherein the metal case is mounted on said first connector housing; and
    a spring mechanism provided on a surface of said metal case on the optical-element-fixing side thereof, said spring mechanism urging the optical element to a side of said second connector housing;
    wherein
        the first connector housing comprises electrically conductive resin; and
        the second connector housing comprises non-electrically conductive resin.

2. An optical/electric composite connector according to claim 1 wherein:
    said second connector housing is provided on a side of one end of said first connector housing, and into which a connection end surface of an optical fiber coupled to said optical element is inserted; and
    wherein said second connector housing comprises an electrical terminal.

3. An optical/electric composite connector according to claim 1 wherein:
    said first connector housing and said second connector housing are detachably connected to each other.

4. The optical/electric composite connector of claim 1, wherein said first and second connector housings are formed substantially of polybutylene telephtalate.

5. The optical/electric composite connector of claim 1, wherein said electric conductive resin comprises carbon filler.

6. The optical/electrical composite connector of claim 1, wherein said metal case is electrically coupled to said first connector housing and is configured to shield electrical noise.

7. The optical/electric composite connector of claim 1, wherein said non-electric conductive resin comprises glass filler.

* * * * *